(12) United States Patent
Tan et al.

(10) Patent No.: US 7,691,788 B2
(45) Date of Patent: Apr. 6, 2010

(54) COMPOSITIONS AND METHODS OF USING SAME IN PRODUCING HEAVY OIL AND BITUMEN

(75) Inventors: Jiasen Tan, Bakersfield, CA (US);
Ahmed Hammami, Edmonton (CA);
Moin Muhammad, Edmonton (CA);
Hussein Alboudwarej, Edmonton (CA);
Abdel M. Kharrat, Edmonton (CA)

(73) Assignee: Schlumberger Technology Corporation, Sugar Land, TX (US)

( * ) Notice: Subject to any disclaimer, the term of this patent is extended or adjusted under 35 U.S.C. 154(b) by 767 days.

(21) Appl. No.: 11/426,359

(22) Filed: Jun. 26, 2006

(65) Prior Publication Data

US 2007/0295640 A1 Dec. 27, 2007

(51) Int. Cl.
*C04B 33/04* (2006.01)
(52) U.S. Cl. .......................................... 507/90; 166/305
(58) Field of Classification Search .................... 507/90; 166/305.1
See application file for complete search history.

(56) References Cited

U.S. PATENT DOCUMENTS

| 3,954,141 | A | * | 5/1976 | Allen et al. ................ | 166/403 |
| 4,334,976 | A | * | 6/1982 | Yan ............................ | 75/330 |
| 5,100,531 | A | | 3/1992 | Stephenson et al. | |
| 5,104,556 | A | | 4/1992 | Al-Yazdi | |
| 5,804,060 | A | | 9/1998 | Benguigui et al. | |
| 5,814,286 | A | | 9/1998 | Hood et al. | |
| 5,843,302 | A | | 12/1998 | Hood | |
| 5,914,010 | A | | 6/1999 | Hood et al. | |
| 5,919,355 | A | | 7/1999 | Hood | |
| 5,944,984 | A | | 8/1999 | Benguigui et al. | |
| 5,976,361 | A | | 11/1999 | Hood et al. | |
| 6,183,627 | B1 | | 2/2001 | Friday et al. | |
| 6,220,352 | B1 | * | 4/2001 | Walton ........................ | 166/263 |
| 6,274,003 | B1 | | 8/2001 | Friday et al. | |
| 6,274,032 | B2 | | 8/2001 | Hood et al. | |
| 6,357,526 | B1 | | 3/2002 | Abdel-Halim et al. | |
| 6,365,038 | B1 | | 4/2002 | Doron | |

FOREIGN PATENT DOCUMENTS

| CA | 2132041 | 3/1995 |
| RU | 2274742 C1 | 4/2006 |
| SU | 1487555 A1 | 5/1995 |

OTHER PUBLICATIONS

Auflem, "Influence of Asphaltene Aggregation and Pressure on Crude Oil Emulsion Stability", PhD thesis, Department of Chemical Engineering, Norwegian University of Science and Technology, Trondheim, Jun. 2002.

Kerr et al., "The Long Lake Project—The First Field Integration of SAGD and Upgrading", Soc of Pet. Engrs., SPE/PS-CIM/CHOA, presented at the 2002 SPE International Thermal Operations and Heavy Oil Symposium and International Horizontal Well Technology Conference, Calgary, Alberta, Canada, Nov. 4-7, 2002.

Merino-Garcia, "Calorimetric Investigation of Asphaltene Self-Association and Interaction With Resins", Graduate School of Engineering, Technical Univ. of Denmark, Graduate School Yearbook 2003, pp. 95-100 (2004).

Verdier, "Experimental Study and Modeling of Asphaltene Precipitation Caused y Gas Injection", Graduate School of Engineering, Technical Univ. of Denmark, Graduate School Yearbook 2003, pp. 115-116 (2004).

Pfieffer, J.P.; Saal, R.N.J. "Asphaltic Bitumen as Colloid System" J. Phy. Chem., 1940, 44, 139-149.

Dickie, J.P. and Yen, T.F. "Macrostructures of the asphaltic fractions by various instrumental methods" Anal. Chem. 39, 1847, 1967.

Storm, D.A. and Sheu, E.Y. "Colloidal Nature of Petroleum asphaltenes". Asphaltenes and asphalt, 1. Developments in Petroleum Science, 40. Edited by Yen T.F. and Chilingarian G.V., Elsevier Science B.V., 1994.

Hirshberg, A. deJong, L.N.J., Schipper, B.A., and Meijer, J.G.: "Influence of Temperature and Pressure on Asphaltene Flocculation," SPEJ (Jun. 1984) 283-293.

Hansen, Charles M., "The Three Dimensional Solubility Parameter—Key to Paint Component Affinities: I. Solvents Plasticizers, Polymers, and Resins," Journal of Paint Technology, vol. 39, No. 505,1967, 104-117.

* cited by examiner

*Primary Examiner*—Timothy J. Kugel
*Assistant Examiner*—Atnaf Admasu
(74) *Attorney, Agent, or Firm*—Jeffrey L. Wendt; Wayne I. Kanak

(57) ABSTRACT

Compositions and methods of using same are described for negating asphaltene deposition in a formation, wellbore, near wellbore region, and production tubing. Compositions of the invention comprise an asphaltene solvent and a viscosity reducing agent, the asphaltene solvent and viscosity reducing agent present in a ratio so as to substantially reduce viscosity of an asphaltene-containing material while substantially negating deposition of asphaltenes either in a reservoir, in production tubing, or both when mixed or otherwise contacting the asphaltene-containing material. Methods of the invention comprise forcing a composition comprising an asphaltene solvent and a viscosity reducing agent to contact an asphaltene-containing hydrocarbon in an underground geologic formation, and producing from the formation a production composition comprising at least some of the treatment composition and at least some of the asphaltene-containing hydrocarbon under conditions sufficient to substantially negate deposition of asphaltenes in the formation.

7 Claims, 1 Drawing Sheet

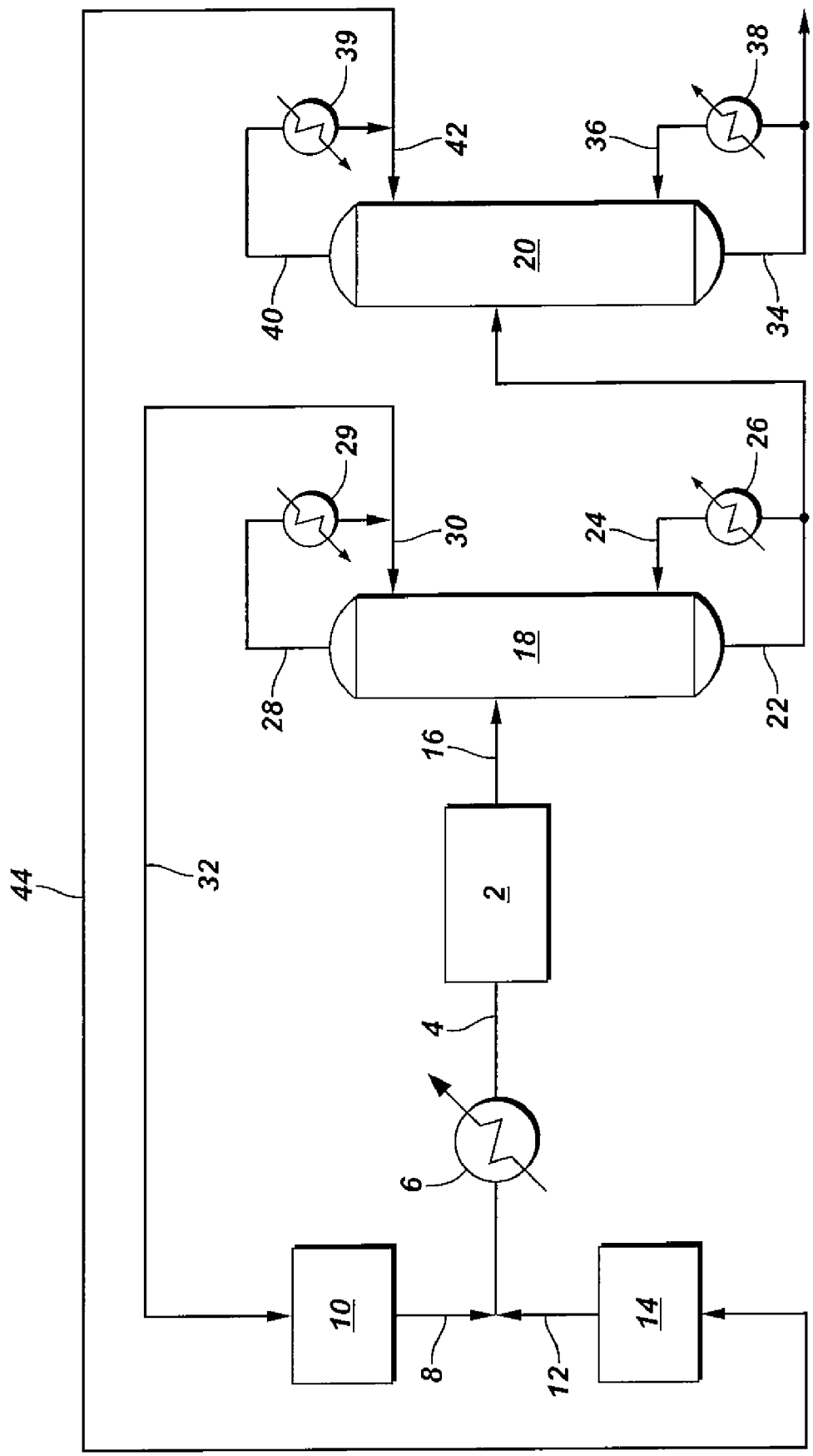

COMPOSITIONS AND METHODS OF USING SAME IN PRODUCING HEAVY OIL AND BITUMEN

BACKGROUND OF THE INVENTION

1. Field of Invention

The present invention relates generally to the field of heavy oil and bitumen recovery, and more specifically to compositions and methods of use thereof for production of heavy oil and bitumen from reservoirs containing same.

2. Related Art

Asphaltenes are the heaviest, most polar fraction of bitumen and are defined as the fraction, which are soluble in aromatic solvents such as toluene or benzene and precipitate from an oil sample upon the addition of n-alkanes such as n-heptane or n-pentane. Due to the complex structure of asphaltenes, it has proven difficult to establish the nature of asphaltenes in crude oil. This is partly because asphaltenes are a solubility class and not a pure component. They consist of tens of thousands of chemical species and the composition is not well defined. In addition, they appear to interact with each other and the other oil constituents in a complex manner. It has been proposed that asphaltenes exist as colloidal particles (Pfieffer and Saal, 1940; Dickie and Yen, 1967), as micelles or reverse micelles (Storm and Sheu, 1994) or as macromolecules in a non-ideal solution (Hirshberg et al., 1984). These proposed structures lead to different modeling approaches based on the identified structure of asphaltenes in crude oils.

In a stable crude oil, asphaltenes are in thermodynamic equilibrium with other components of the oil. However asphaltenes may precipitate due to disruption of this thermodynamic equilibrium due to a change in pressure, temperature or composition of the system. In other word composition and operational changes may affect the solubility of asphaltenes in oil and cause the asphaltenes to precipitate. In order for a liquid (oil) to dissolve a solute (asphaltene), the interaction between liquid and solid molecules should be as strong as the interaction between liquid molecules. Solubility parameter, or rather the difference in solubility parameters, is a good measure of the solubility of a solute in a solvent. Solubility parameter is a type of cohesion parameter, which describes the interaction between molecules in condensed material. However, solvents with similar solubility parameter may have different solvating power due to the nature of their molecules. This distinction is best described by Hansen solubility parameter (Hansen et al., 1967), which is a combination of dispersive, polar, and hydrogen bonding solubility parameters accounting for the nature of the molecules. It is also important to note that the solubility parameter of a liquid mixture is proportional to the amount of each liquid assuming the two liquids are completely miscible. Having this property in mind, a cocktail of solvents may be prepared to have a specified solubility parameter to ensure solvency of the solute, while providing other properties such as relatively lower surface tension for viscosity reduction.

Light hydrocarbons, such as propane, butane, and the like, are known to induce not only asphaltene precipitation but also resin instability upon mixing. Aromatic compounds, such as toluene, xylene, and the like, as well as some other solvents like $CS_2$ are true asphaltene solvents. In other words, asphaltene solids dissolve in these solvents.

Heavy oil and bitumen are very viscous and difficult to recover from the reservoir. One way to reduce the viscosity of heavy oil is injection of hydrocarbon vapors, such as n-butane at its dew point pressure through a horizontal well. The diluted oil is then produced from another horizontal well beneath the injector by gravity. This method is called vapor extraction or "vapex." Vapor extraction has been studied on a laboratory scale for more than a decade, but commercial application of this method has been limited. One of the limiting factors is solid asphaltene precipitation and deposition in the reservoir and/or flow lines. The main disadvantage of previously proposed vapor extraction processes is the precipitation of asphaltenes during the course of production in the reservoir causing not only wettability alteration of reservoir rock, but also a more severe production problem which is the plugging of reservoir flow channels (also known as reservoir pores). This is known in the art as formation damage. If plugged, the reservoir cannot produce the the otherwise recoverable oil in place.

Thermal methods such as steam injection and cyclic steam stimulation have been used for heavy oil recovery for more than 50 years. However, thermal methods (involving steam) are being increasingly challenged by reservoir conditions and environmental issues. For thin reservoirs, heat loss to the adjacent formation may be prohibitively high. Reservoirs with underlying aquifer, fracture, or sensitive clays are also not suitable for steam injection. Another limiting factor is the reservoir depth. If the reservoir is too deep, the steam temperature has to be high, which results in higher heat loss and causes more mechanical problems for the tools. A more serious issue is the use and contamination of water, which otherwise would be useful for agriculture or other civil purposes. Consequently, tighter legislations are emerging to control/curb water use for the energy industry.

Steam injection for heavy oil recovery may eventually become unattractive due to either lack of suitable reservoirs or environmental constraints/regulations. An alternative to thermal recovery processes is, therefore, necessary. The above-described vapor extraction process is a variant to the steam assisted gravity drainage (SAGD) process but it has numerous implementation problems as discussed above, namely, solid asphaltene precipitation and/or deposition in the reservoir and flow lines. Thus, a practical approach is required to reduce/mitigate the adverse effects of precipitated/deposited asphaltenes while using a vapex process.

U.S. Pat. No. 6,357,526 (Abdel-Halim, et al), discusses field upgrading of heavy oil and bitumen. Other patents of interest include the following patents assigned to Ormat, Inc., related to crude oil deasphalting technology: U.S. Pat. Nos. 5,804,060; 5,814,286; 5,843,302; 5,914,010; 5,919,355; 5,944,984; 5,976,361; 6,183,627; 6,274,003; 6,274,032; 6,365,038.

U.S. Pat. No. 5,100,531 discusses an asphalt or asphaltene refinery anti-foulant technique comprising the use in crude oil, or crude oil fraction, streams of alkyl-substituted phenol formaldehyde liquid resins in combination with hydrophilic-lipophilic vinylic polymers. The polymeric anti-foulant is stated, when added to asphalt or asphaltene containing crude oil streams, to prevent fouling of metallic, or other, i.e. ceramic, surfaces, especially heat transfer surfaces.

SUMMARY OF THE INVENTION

In accordance with the present invention, compositions and methods of using same during production of asphaltene-containing materials such as heavy oil and/or bitumen from an underground hydrocarbon-bearing geologic formation or reservoir are described that reduce or overcome problems using previously known compositions and One aspect of the invention are compositions comprising, an asphaltene solvent and a viscosity reducing agent, the asphaltene solvent and viscosity reducing agent present in a ratio so as to substantially reduce viscosity of an asphaltene-containing material (for example heavy oils, bitumen, and the like) while substantially negating deposition of asphaltenes either in a reservoir, in production tubing, or both when mixed or otherwise contacting the asphaltene-containing material. In certain embodiments, the viscosity reducing agent may be a hydrocarbon vapor or gas (at room temperature and pressure) and the asphaltene solvent may comprise toluene or a toluene equivalent, and these compositions may be termed super solvents for vapor extraction methods. The inventive compositions may have large molar volume at reservoir conditions (around 5 MPa and 293 K) to maximize the gravity effect for the diluted heavy oil to drain. The inventive compositions may exist in single vapor phase or in super critical state at reservoir conditions, and/or at injection pressure and temperature, and may have high vapor pressure at ambient temperature (at least as high as iso-octane) to enable recycling of the composition from the recovered oil simply by reducing the pressure, optionally with addition of heat.

Compositions of the invention include those wherein the asphaltene solvent and the viscosity reducing agent are at least partially miscible at temperatures above about 273 K. The asphaltene solvent and viscosity reducing agent may be present at a volume or molar ratio ranging from about 100:1 to about 1:100, or from about 10:1 to about 1:10.

Other compositions of the invention are those wherein the viscosity reducing agent is selected from normal, branched, and cyclic alkanes having from 1 to about 20 carbon atoms, mono-alkenes having from 1 to about 20 carbon atoms, carbon dioxide, pyrrolidones such as n-methyl-2-pyrrolidone (NMP), and combinations thereof. Certain useful viscosity reducing agents may be characterized as paraffinic. Certain embodiments may comprise n-alkanes having from about 3 to about 8 carbon atoms, such as propane. Drag-reducing agents, such as native and synthetic surfactants, may be utilized in certain embodiments, where "native" in this context means chemicals present in the crude heavy oil or bitumen. Surfactants may be selected from anionic, cation, nonionic, amphoteric surfactants, and combinations of two or more of these. Examples are provided herein.

The asphaltene solvent may be selected from compositions comprising benzene and benzene derivative compounds within the general formula (I) and salts and mixtures thereof:

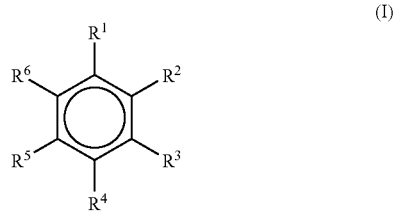

(I)

wherein $R^1$-$R^6$, inclusive, are radicals independently selected from hydrogen, hydroxyl, halogen, nitrate, amine, sulfate, carboxyl, amide, and the like, linear and branched alkyl substituents, aromatic, cyclic, alkaryl, aralkyl substituents or mixtures thereof; and where the R groups may each contain from 1-30 carbon atoms. Examples include toluene and toluene equivalents, such as benzene, xylene (ortho, meta, and para), styrene, methylbenzene, and mixtures thereof As used herein the term benzene derivative means compounds having from one to six substituents attached to the central benzene core. Polycyclic aromatic hydrocarbons such as naphthalene, anthracene, and phenanthrene may also be present. Native and/or synthetic resins, resinous aromatic compounds, and the like may also be useful asphaltene solvents.

Another aspect of the invention are methods, one method comprising forcing a composition of the invention to contact an asphaltene-containing hydrocarbon in an underground geologic formation, and producing from the formation a production composition comprising at least some of the inventive composition and asphaltene-containing hydrocarbon under conditions sufficient to substantially negate deposition of asphaltenes in the formation.

In sum, compositions and methods of the invention may exhibit numerous advantages over existing SAGD methods, namely (compared to SAGD methods): lower energy consumption, minimum heat loss better protection of environment, no or little usage of water, less $CO_2$ generation, no formation damage due to clay swelling, less required amount of injection; lower capital and operating expense. In addition compositions and methods of the invention may employ relatively easy solvent/vapor recycle at the surface, and exhibit little or no asphaltene precipitation in the reservoir and/or the production tubing compared with previous vapor extraction methods.

Compositions and methods of the invention will become more apparent upon review of the detailed description of the invention and the claims that follow.

BRIEF DESCRIPTION OF THE DRAWINGS

The manner in which the objectives of the invention and other desirable characteristics may be obtained is explained in the following description and attached drawing in which:

FIG. 1 is a schematic process flow diagram of one method of the invention including recycle of asphaltene solvent and viscosity reducing agent to separate tanks, and other optional features.

It is to be noted, however, that the appended drawing is not to scale and illustrates only a typical embodiment of this invention, and is therefore not to be considered limiting of its scope, for the invention may admit to other equally effective embodiments.

DETAILED DESCRIPTION

In the following description, numerous details are set forth to provide an understanding of the present invention. However, it will be understood by those skilled in the art that the present invention may be practiced without these details and that numerous variations or modifications from the described embodiments may be possible.

With the depletion of conventional oil supplies, bitumen extracted from oil sands has become a more attractive source of unconventional crude. The USA and Canada have the world largest oil sand reserves, which are estimated to be 58.1 billion barrels and 1.6 trillion barrels, respectively. Bitumen contained in the oil sand is highly viscous with API gravities from 1 to 10. The bitumen is made up primarily of distillate and vacuum gas oil cuts in addition to contaminants such as solids, asphaltenes, carboxylic and other organic acids, salts, heteroatoms such as sulfur, nitrogen, and oxygen, and heavy metals. Bitumen must be first separated from the oil sand, and then upgraded before it can be used as a refinery feedstock.

The major three bitumen recovery technologies include surface mining, in-situ steam assisted gravity drainage (SAGD), and thermal treatment. SAGD is commercially proven and is used to recover bitumen which is not accessible by surface mining. However, the process requires large amounts of steam and is quite energy intensive. Thermal treatment such as vacuum pyrolysis is under investigation and development. This process produces less environmental pollution than the other two processes but consumes large amounts of energy. The surface mining process is widely used commercially, and is discussed herein.

Surface mining is currently used to recover bitumen from oil sands and includes process steps such as oil sands mining, bitumen extraction, and bitumen separation. The bitumen product is then sent to upgrading. Two major procedures for extraction and separation involves 1) water extraction which uses hot water and caustic to wash and float the bitumen from the sand, and 2) organic solvent extraction, which employs an organic solvent to dissolve the bitumen from the surface of the oil sand. The disadvantages of the solvent extraction process are from surface mined oil sands include environmental pollution due to the loss of solvent; storage of solvent inventories; large quantities of water are required to remove the solvent from the sand after extraction; and difficulties in process scale up. The hot water extraction process is employed by Syncrude Canada Ltd. in Canada. The process is described based on information from the Syncrude website. Oil sand is first washed by hot water and caustic to form a three-phase suspension made up of bitumen, water, and solids. The suspension (which say or may not also include an emulsion layer), which has been diluted with naphtha, enters a separation system involving gravity separation, flotation, centrifugation, and distillation where bitumen, solids, water, and naphtha are separated from each other. If the hot water extraction and the separation operations are successful, the bitumen product will contain very low concentrations of solids and water, and will be ready for downstream upgrading by coking or hydrocracking. A synthetic crude oil is produced by the upgrading process. However, various problems exist in the extraction and separation steps, which may lead to ineffective separation of the bitumen, solids, and water that may result in: large quantities of water usage and disposal in the tailings pond; environmental pollution; high energy consumption; unacceptable bitumen quality.

The first commercial crude-bitumen production project using in-situ techniques in Canada began in 1978. The traditional application of in-situ production techniques involved drilling a well into the oil sands and extracting the bitumen almost as if it were conventional crude oil. The maturation of horizontal well technology and the development of steam assisted gravity drainage (SAGD) extraction techniques have revolutionized the in situ production industry. With the SAGD technology, two horizontal wells are drilled into the same reservoir, one directly above the other. Steam is injected into the top well, which heats up the surrounding tar-like bitumen and causes it to drain with the aid of gravity into the well bore of the lower well. considerably higher than for a conventional vertical well, the productivity levels of the wells are increased dramatically.

A separation train for producing and upgrading heavy oil and bitumen was reported by Kerr et al., "The Long Lake Project—The First Field Integration of SAGD and Upgrading", Soc of Pet. Engrs., SPE/PS-CTM/CHOA, presented at the 2002 SPE International Thermal Operations and Heavy Oil Symposium and International Horizontal Well Technology Conference, Calgary, Alberta, Canada, 4-7 Nov. 2002 (herein after Kerr et al.). This publication explains in some detail the OrCrude™ Process for upgrading heavy oil and bitumen, apparently a joint effort of OPTI Canada Inc and Nexen Inc. As presented therein, the process produces a light, sweet synthetic crude from SAGD using an partially upgrade bitumen and produce an asphaltene by-product. The partially upgraded bitumen is then processed in a hydrocracker to produce what they term a premium synthetic crude. The asphaltenes are fed to an asphaltene gasification system to produce hydrogen for the hydrocracker and syn gas fuel for the SAGD process. In processes such as this, a higher content of asphaltenes in the raw heavy oil will enable the production of more hydrogen for the hydrocracker and syn fuel gas for the SAGD process. Thus, compositions and methods of the invention may be used in an integrated SAGD, syn crude, vapor extraction process, and may completely replace SAGD for extremely deep and/or thin reservoirs.

The main disadvantage of existing vapor extraction compositions and processes is the precipitation of asphaltenes during the course of production in the reservoir causing not only wettability alteration of reservoir rock, but also a more severe production problem which is the plugging of reservoir flow channels (also known as reservoir pores). If plugged, the reservoir cannot produce the otherwise recoverable oil in place. Thus a practical approach is required to reduce/mitigate the adverse effects of precipitated/deposited asphaltenes while using a vapor extraction process.

One feature of the invention is to combine one or more asphaltene solvents, such as aromatic/polar (toluene equivalent) solvents, with one or more viscosity reducing agents, for example light n-alkanes, as a vapor/solvent mixture, which may be alkanes and some alkenes, and other compounds such as carbon dioxide, n-methyl-2-pyrrolidone, and the like generally have lower surface tension compared to aromatic solvents. The lower surface tension makes them very good candidates for viscosity reduction of heavy oils. At the same time n-alkanes and the like induce asphaltene precipitation, which may lead to deposition and reservoir plugging. On the other hand, aromatic solvents maintain the solubility of asphaltenes in oil but they are not as effective as n-alkanes and the like in reducing viscosity. If aromatic/polar solvents and viscosity reducing agents such as n-alkanes are mixed in a controlled ratio, the resulting mixture may utilize both the solvency power of aromatic/polar solvents and viscosity reduction of n-alkanes and like components. Compositions of the invention, then used in a vapor extraction process, stabilize asphaltenes as the oil viscosity is reduced, and may then be recovered.

As compositions of the invention are used for reservoir injection, they may have the following properties: large molar volume at reservoir conditions (around 5 MPa and 293 K) to maximize the gravity effect for the diluted heavy oil to drain; at reservoir conditions or injection pressure and temperature, the composition may be in a single vapor phase or in super critical state; the compositions may have high vapor pressure at ambient temperature to enable ease of recycling the inventive compositions from the recovered oil simply by reducing the pressure. The inventive compositions sufficiently negate precipitation of asphaltene solids, and decrease viscosity of heavy oil and bitumen.

Furthermore, as the cost of using compositions of the invention for vapor extraction processes and, especially, for transportation of the recovered/diluted oil through the pipelines may be relatively high, it is a optional feature of the invention to include a solvent and viscosity reducing agent recovery and recirculation process so as the corresponding cost will be considered as a capital expenditure. This may easily be implemented taking advantage of the boiling point difference between the compositions of the invention and the heavy oil (i.e., distillation plant at final destination). In fact, there are similar processes currently in use by the heavy oil industry in Canada for transporting heavy oil using naphtha.

Compositions useful in the invention comprise at least one viscosity production tubing, surface equipment, and the like. In many embodiments they may be considered paraffinic in nature. Viscosity reducing agents useful in the invention may be selected from normal, branched, and cyclic alkanes having from 1 to about 20 carbon atoms, such as propane, n-butane, n-pentane, n-hexane, n-heptane, n-octane, iso-butane, iso-pentane, iso-hexane, iso-heptane, iso-octane, cyclohexane; mono-alkenes having from 1 to about 20 carbon atoms, such as 1,2-butene, 2,3-butene, 1,2-pentane, 2,3-pentene, 1,2-octene, and the like; carbon dioxide; pyrrolidones such as n-methyl-2-pyrrolidone (NMP), and combinations and mixtures thereof. The viscosity reducing agent may be selected from n-alkanes having from about 3 to about 8 carbon atoms, such as propane, n-butane, n-pentane, rn-hexane, nr-heptane, and n-octane.

The asphaltene solvent may be selected from compositions comprising benzene and benzene derivative compounds within the general formula (I) and salts and mixtures thereof:

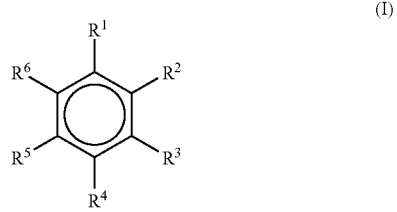

(I)

wherein $R^1$-$R^6$, inclusive, are radicals independently selected from hydrogen, hydroxyl, halogen, nitrate, amine, sulfate, carboxyl, amide, and the like, linear and branched alkyl substituents, aromatic, cyclic, alkaryl, aralkyl substituents or mixtures thereof; and where the R groups may each contain from 1-30 carbon atoms. Included within general formula (I) are benzene, toluene, xylene (ortho, meta, and para), and mixtures thereof. As used herein the term benzene derivative means compounds having from one to six substituents attached to the central benzene core. Examples of benzene compounds with just one substituent are phenol which carries a hydroxyl group and toluene with a methyl group. When there is more than one substituent present on the ring their spatial relationship becomes important for which the arene substitution patterns ortho, meta and para are devised. For example three isomers exist for cresol because the methyl group and the hydroxyl group can be placed next to each other (ortho), one position removed from each other (meta) or two positions removed from each other (para). Xylenol has two methyl groups in addition to the hydroxyl group and for this structure 6 isomers exist. Examples of benzene derivative with alkyl substituents (alkylbenzenes) are: ethyelbenzene $C_6H_5$—$CH_2$—$CH_3$; mesitylene $C_6H_3$(—$CH_3$)$_3$; toluene $C_6H_5$—$CH_3$; xylene $C_6H_4$(—$CH_3$)$_2$. Examples of various benzenes usable in the invention include: aniline $C_6H_5$—$NH_2$; acetal salicylic acid $C_6H_4$(—O—C(=O)—$CH_3$)(—COOH); benzoic acid $C_6H_5$—COOH; biphenyl $(C_6H_5)_2$; chlorobenzene $C_6H_5$—Cl; nitrobenzene $C_6H_5$—$NO_2$; paracetamol $C_6H_4$(—NH—C(=O)—$CH_3$)(—OH); phenacetin $C_6H_4$(—NH—C(=O)—$CH_3$)(—O—$CH_2$—$CH_3$); phenol $C_6H_5$—OH; picric acid $C_6H_2$(—OH)(—$NO_2$)$_3$; salicylic acid $C_6H_4$(—OH)(—COOH); and trinitrotoluene $C_6H_2$(—$CH_3$)(—$NO_2$)$_3$. Polycyclic aromatic hydrocarbons such as naphthalene, anthracene, and phenanthrene may also be present.

As used herein the phrase "viscosity reducing agent" means an organic compound or mixture of compounds that, when combined with an asphaltene-containing composition, reduces the viscosity of the latter by a substantial amount in order that the combination of asphaltene-containing composition and composition of the invention may be produced from an underground formation. The amount of viscosity reduction is dependent upon the character of the formation (pore size, rock type, and the like), the character of the hydrocarbon present in the formation, the type and power of pumping equipment available to the operator, diameter of the well bore and any casing pipe, temperature and pressure of the formation, and like considerations. Generally, the amount of viscosity reduction may be 5 percent or more, and in certain embodiments may range from about 5 percent up to 50 percent, based on the known or expected viscosity of the asphaltene-containing material.

The term "composition" means a composition of matter functioning to provide the stated viscosity reduction and asphaltene deposition negation functions. Compositions of the invention may be gaseous, liquid, supercritical, and any combination thereof. The term "wellbore" includes cased, cased and cemented, or open hole wellbores, and may be any type of well, including, but not limited to, a producing well, a non-producing well, an experimental well, an exploratory well, and the like. Wellbores may be vertical, horizontal, any angle between vertical and horizontal, diverted or non-diverted, and combinations thereof, for example a vertical well with a non-vertical component. The term "substantially negating deposition of asphaltenes" means inhibiting formation of deposits of asphaltenes; while some deposition may be acceptable, or may already be present in a particular formation, one goal of compositions and methods of the invention is to prevent further deposition of asphaltenes so that the desired hydrocarbons may be produced at an acceptable rate compared to when no composition of the invention is employed.

Compositions of the invention include those wherein the asphaltene solvent and the viscosity reducing agent are at least partially miscible at temperatures above about 273 K. The asphaltene solvent and viscosity reducing agent may be present at a volume or mol ratio ranging from about 1:1 to about 1:100, or from about 10:1 to abut 1:10. Higher ratios of asphaltene solvent to viscosity reducing agent may result in decreased asphaltene deposition and/or precipitation while sacrificing viscosity reduction, while lower ratios of asphaltene solvent to viscosity reducing agent may result in less viscous production materials which are therefore easier to displace from the formation, but at the possible expense of higher asphaltene deposition.

Within the defined groups of asphaltene solvents and viscosity-reducing agents, a number of specific composition examples may be mentioned. Examples of exemplary compositions of the invention include those comprising from 50 to 80 molar percent of propane and 20 to 50 molar percent of toluene; compositions comprising from 50 to 70 molar percent propane, and 30 to 50 molar percent para-xylene; compositions comprising from 50 to 70 molar percent n-butane, 1-20 molar percent ortho-xylene, 1-20 molar percent meta-xylene, and 1-molar percent toluene; compositions comprising 50-80 molar percent toluene and 20-50 molar percent pentane, and the like.

Compositions of the present invention are not necessarily devoid of other organic or inorganic compounds, as long as their presence does not tend to work against or undo the functions of the asphaltene solvent and viscosity reducing agent. These other organic or inorganic compounds may be deemed additives, and may be solid, liquid, gaseous, or supercritical, depending on the particular formation being treated. The maximum amount of any particular additive also depends on the formation being treated and the Known or expected constituents of the hydrocarbon and fork herein. For example compositions of the invention may include up to 20 molar percent water and an acid, such as hydrochloric acid, at a defined acid concentration or pH. Drag-reducing agents, such as native and synthetic surfactants, may be utilized in certain embodiments, where "native" in this context means chemicals present in the crude heavy oil or bitumen.

Surfactants may be selected from anionic, cation, nonionic, amphoteric surfactants, and combinations of two or more of these. Examples of suitable anionic surfactants include: dodecylbenzene sulfonic acid, sodium dodecylbenzene sulfonate, potassium dodecylbenzene sulfonate, triethanolamine dodecylbenzene sulfonate, morpholinium dodecylbenzene sulfonate, ammonium dodecylbenzene sulfonate, dinonylbenzene sulfonate, potassium didodecylbenzene sulfonate, dodecyl diphenyloxide disulfonic acid, sodium dodecyl diphenyloxide disulfonate, isopropylamine decyl diphenyloxide disulfonate, sodium hexadecyloxypoly (ethyleneoxy) (10)ethyl sulfonate, potassium octylphenoxypoly(ethyleneoxy) (9)ethyl sulfonate, sodium alpha C.sub.12-14 olefin sulfonate, sodium hexadecane-1 sulfonate, sodium ethyl oleate sulfonate, potassium octadecenylsuccinate, sodium oleate, potassium laurate, triethanolamine myristate, morpholinium tallate, potassium tallate, sodium lauryl sulfate, diethanolamine lauryl sulfate, sodium laureth (3) sulfate, ammonium laureth (2) sulfate, sodium nonylphenoxypoly(ethyleneoxy)(4) sulfate, sodium decyloxypoly(ethyleneoxy(5)methyl)carboxylate, sodium octylphenoxypoly(ethyleneoxy(8)methyl)carboxylate, sodium mono decyloxypoly(ethyleneoxy)(4)phosphate, sodium didecyloxpoly(ethyleneoxy)(6)phosphate, and potassium mono/di octylphenoxypoly(ethyleneoxy)(9)phosphate.

Examples of suitable nonionic surfactants include octylphenoxypoly(ethyleneoxy)(11)ethanol, nonylphenoxypoly(ethyleneoxy)(13)ethanol, dodecylphenoxypoly(ethyleneoxy)(10)ethanol, polyoxyethylene (12) lauryl alcohol, polyoxyethylene (14) tridecyl alcohol, lauryloxypoly(ethyleneoxy)(10)ethyl methyl ether, undecylthiopoly(ethyleneoxy)(12)ethanol, methoxypoly(oxyethylene(10)/(oxypropylene(20))-2-propanol block copolymer, polyoxyethylene (9) monolaurate, polyoxyethylene (8) monoundecanoate, polyoxyethylene (20) sorbitan monostrearate, polyoxyethylene (18) sorbitol monotallate, sucrose monolaurate, lauramidopropyl-N,N-dimethylamine oxide, 1:1 lauric diethanolamide, 1:1 coconut diethanolamide, 1:1 mixed fatty acid diethanolamide, polyoxyethylene(6)lauramide, 1:1 soya diethanolamidopoly(ethyleneoxy)(8)ethanol, and coconut diethanolamide.

Examples of suitable cationic surfactants include n-alkyl dimethyl ethylbenzyl ammonium chlorides, hexadecyltrimethylammonium methosulfate, didecyldimethylammonium bromide and a mixture of n-alkyl dimethyl benzyl ammonium betaine, sodium palmityloamphopropionate, N-coco beta-aminopropionic acid, disodium N-lauryliminodipropionate, sodium coco imidazoline amphoglycinate and coco betaine.

Optionally, the solubility parameters of the asphaltene solvent, viscosity reducing agent, and any optional additives should be within about 3 $(cal/cm^3)^{0.5}$ and may in exemplary embodiments be within 1 or even 0.5 $(cal/cm^3)^{0.5}$.

In use, compositions of the invention may be forced to contact an asphaltene-containing hydrocarbon in an underground geologic formation by pumping from the surface, from a wellbore, or some combination thereof. FIG. 1 illustrates a process flow diagram of one method in accordance with the invention. The compositions of the invention may be delivered to the site of use ready for use (i.e with all or a portion of the ingredients already combined), or may be prepared on-site, either at the surface or downhole, using suitable mixing equipment. FIG. 1 illustrates a well or reservoir 2 accepting a feed of composition of the invention through a conduit 4. Compositions of the invention may be heated or cooled, as indicated by a heat exchanger 6, or changed in pressure as desired during mixing and/or during application. For example, the temperature of the composition may be adjusted at the surface in heat exchanger 6 to accommodate changes in wellbore temperatures, which may deter deposition of asphaltenes in the reservoir and/or in the wellbore or near-wellbore regions. Compositions of the invention may be heated or cooled produced liquids, or cooled by exchanging heat with tundra.

In certain methods of the invention, the conditions sufficient to avoid substantial deposition of asphaltenes may comprise heating or cooling the composition, the reservoir, or both to temperatures ranging from 0° C. to 200° C., adjusting pressure of the reservoir, the composition, or both to pressure ranging from about 1 to about 10 MPa, and adjusting the molar ratio of asphaltene solvent to viscosity reducing agent from between about 10:1 to about 1:10.

As illustrated in FIG. 1, asphaltene solvent may be sourced form a tank 10 and conduit 8, while viscosity reducing agent may be sourced form a tank 14 and conduit 12. In some methods of the invention, a composition of the invention may be forced into one or more injection wellbores, and produced fluid 16 comprising at least some of the composition of the invention and at least some of the asphaltene-containing hydrocarbon may be produced from one or more production wellbores. Alternatively, compositions of the invention passing through conduit 4 may be injected, and asphaltene-containing fluids 16 may be produced from the same wellbore.

Other methods of the invention comprise reducing pressure of the produced fluids, optionally with application of heat, to separate and recover at least a portion of the composition of the invention from the asphaltene-containing materials, and recycling the composition of the invention. This is illustrated by first and second flash towers 18 and 20, respectively. A bottoms stream 22 from first tower 18 may comprise the majority of the asphaltene solvent or the viscosity reducing agent, which ever has the lower vapor pressure, along with the produced heavy oil or bitumen. A portion of bottoms stream 22 may optionally be heated by a first reboiler 26 to produce a vapor which passes through conduit 24 and back into tower 18. An overhead steam 28, comprising primarily asphaltene solvent or viscosity reducing agent, which ever has the lower vapor pressure, may be chilled by a chiller 29, and a portion of a chilled stream returned as reflux to tower 18 in conduit 30. A portion that is not refluxed is recycled to tank 10 in conduit 32. The main portion of stream 22 flows into second flash tower 20, where the other of the asphaltene solvent or viscosity reducing agent is flashed off. A second overhead stream is produced in conduit 40, which may be chilled in a second chiller 39, to produce a second reflux stream in conduit 42 and a second recycle stream in conduit 44 which is routed back to tank 14 for reuse. Other optional steps may include purging, scrubbing, or extracting any unwanted materials from the asphaltene solvent and viscosity reducing agent prior to their being recycled. A second bottoms stream comprised mainly of produced heavy oil and/or bitumen flows from tower 20 through a conduit 34, and a portion may be reboiled in a second reboiler 38 and returned to tower 20 through conduit 36, while a portion is produced as a heavy oil product stream in conduit 34, either to tankage or to an upgrading plant.

Methods of the invention may be combined with previously known methods, as mentioned previously. In certain integrated SAGD and surface upgrading processes, once the bitumen and asphaltenes are separated, some of the asphaltenes may be combusted to produce hydrogen that is later used in hydrocracking of the bitumen into gas oils, or used as fuel gas in producing steam for the SAGD part of the integrated process. Compositions and methods of the invention may be used to increase the amount of asphaltenes retained in the produced composition, especially from deep and/or thin portions of reservoirs, wherein SAGD may be uneconomical or unacceptable due to environmental considerations.

A determination of which asphaltene solvent to use in any particular well may be made using known tests. Resins are polar and "surfactant-like" with a large polar head and long hydrocarbon chain tail. They may act as stabilizers for asphaltenes precluding asphaltene precipitation. The ratio of resins to asphaltene may be of more importance than just asphaltene concentration alone, from a crude oil stability perspective. The NATO ASI test measures asphaltene stability in crude oil by determining the onset of flocculation using a solvent titration method. It determines how stable the asphaltenes are in the oil. For measurements between 0 and 1.5, the crude is deemed unstable. For crudes with ASI's between 1.5 and 2.5, the crude is measured to be moderately stable. Crudes over 2.5 are stable. The oil sample is heated and allowed to equilibrate. A non-solvent, such as the viscosity reducing agent n-butane is added, and the near laser transmittance is monitored. When asphaltenes begin to floc, laser transmittance will decrease. The transmittance is plotted vs. volume of non-solvent added, and therefore it is a relative measure of the point of Although only a few exemplary embodiments of this invention have been described in detail above, those skilled in the art will readily appreciate that many modifications are possible in the exemplary embodiments without materially departing from the novel teachings and advantages of this invention. Accordingly, all such modifications are intended to be included within the scope of this invention as defined in the following claims.

What is claimed is:

1. A method comprising forcing a treatment composition comprising an asphaltene solvent and a viscosity reducing agent to contact an asphaltene-containing hydrocarbon in an underground geologic formation, and producing from the formation a production composition comprising at least some of the treatment composition and at least some of the asphaltene-containing hydrocarbon under conditions sufficient to substantially negate deposition of asphaltenes in the formation, wherein the forcing and producing steps are combined with an integrated steam assisted gravity drainage (SAGD) and surface upgrading process, combusting at least some of the asphaltenes to produce hydrogen that is later used in hydrocracking of bitumen into gas oils, or used as fuel gas in producing steam for the SAGD part of the integrated process.

2. The method of claim 1, comprising preparing the treatment composition on-site, either at the surface or downhole, using suitable mixing equipment.

3. The method of claim 2, comprising heating or cooling, and/or changing pressure during mixing and/or during application, of the treatment composition or the formation.

4. The method of claim 1, wherein the conditions sufficient to avoid substantial deposition of asphaltenes may comprise adjusting the temperature of the treatment composition, the formation, or both to temperatures ranging from 0° C. to 200° C., adjusting the pressure of the formation, the treatment composition, or both to pressure ranging from about 1 to about 10 MPa, and adjusting the molar ratio of asphaltene solvent to viscosity reducing agent from between about 10:1 to about 1:10.

5. The method of claim 1, comprising forcing the treatment composition into one or more injection wellbores, and producing the production composition from one or more production wellbores.

6. The method of claim 1, comprising forcing the treatment composition and producing the production composition from the same wellbore.

7. The method of claim 1, comprising reducing pressure of the production composition, optionally with application of heat, to separate and recover at least a portion of the treatment composition, and recycling the treatment composition.

* * * * *